(12) United States Patent
Kitagawa

(10) Patent No.: US 6,666,109 B2
(45) Date of Patent: Dec. 23, 2003

(54) INDEXING APPARATUS AND METHOD OF ASSEMBLING THE SAME

(75) Inventor: Toshi Kitagawa, Mattou (JP)

(73) Assignee: Tsudakoma Kogyo Kabushiki Kaisha, Kanazawa (JP)

( * ) Notice: Subject to any disclaimer, the term of this patent is extended or adjusted under 35 U.S.C. 154(b) by 12 days.

(21) Appl. No.: 10/025,308

(22) Filed: Dec. 19, 2001

(65) Prior Publication Data

US 2002/0088305 A1 Jul. 11, 2002

(30) Foreign Application Priority Data

Jan. 11, 2001 (JP) ........................................ 2001-003771

(51) Int. Cl.[7] ................................................ F16H 1/16
(52) U.S. Cl. ..................... 74/813 R; 29/38 B; 29/38 C; 29/35.5; 74/820; 74/826
(58) Field of Search ........................... 74/813 R, 606 R, 74/820, 826; 29/38 B, 38 C, 35.5, 36, 39, 40, 41

(56) References Cited

U.S. PATENT DOCUMENTS

| | | | | |
|---|---|---|---|---|
| 3,704,684 A | * | 12/1972 | Brown | ..................... 74/813 X |
| 4,678,381 A | * | 7/1987 | Bailey | ......................... 409/221 |
| 4,785,513 A | * | 11/1988 | Lee et al. | ....................... 29/40 |
| 5,497,060 A | * | 3/1996 | Juergens | ...................... 318/563 |
| 5,540,120 A | * | 7/1996 | Sommer | ................... 74/813 R |
| 2002/0138959 A1 | * | 10/2002 | Kato | ........................... 29/38 B |

FOREIGN PATENT DOCUMENTS

| | | | | |
|---|---|---|---|---|
| JP | 61-236459 | * | 10/1986 | ............... 74/813 R |
| JP | 3-270851 | * | 12/1991 | ........... 74/813 R X |
| JP | 4-348847 | * | 12/1992 | ........... 74/813 R X |
| JP | 5-212467 | * | 8/1993 | ........... 74/813 R X |
| JP | 5-329746 | * | 12/1993 | ........... 74/813 R X |

* cited by examiner

Primary Examiner—Vinh T. Luong
(74) Attorney, Agent, or Firm—Frishauf, Holtz, Goodman & Chick, P.C.

(57) ABSTRACT

A worm shaft having a worm thereon, a worm wheel meshed with the worm, and a motor for driving the worm shaft are provided. The worm shaft and a shaft of the motor are connected together directly without interposing a rotation transmission mechanism, such as a gear therebetween. Both end portions of the worm shaft are supported rotatably on bearings. The bearing for one end portion of the worm shaft is provided on a body frame, and the bearings provided on the side of the motor shaft are fixed to a cylindrical fitting portion of the retainer member to which the motor is fixed.

2 Claims, 5 Drawing Sheets

PRIOR ART

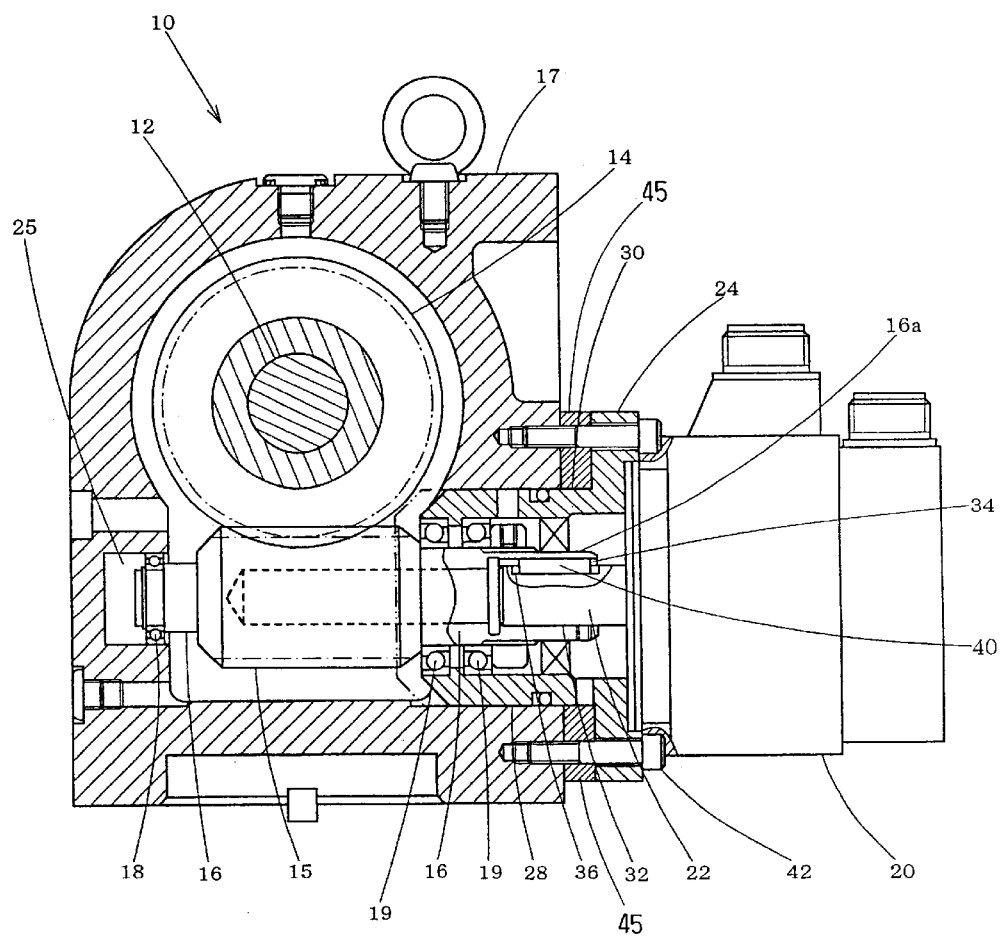

INDEXING APPARATUS AND METHOD OF ASSEMBLING THE SAME

BACKGROUND OF THE INVENTION

1. Field of the Invention

The present invention relates to an apparatus for indexing an angle of rotation of a rotary table and the like having a worm gear mechanism; and a method of assembling the same.

2. Description of the Related Art

In a worm gear mechanism 1 used for a related art apparatus for indexing an angle of rotation of a rotary table and the like, a rotary shaft 2 fixed to a rotary table (not shown) and a worm wheel 4 are joined together fixedly, and a worm 5 is meshed with this worm wheel 4, as shown in FIG. 1. The worm 5 is made integral with a worm shaft 6. The worm shaft 6 is supported rotatably at one end thereof on a taper roller bearing 8 provided on a body 1a of the worm gear mechanism 1, and at the other end thereof on a needle bearing 9. The worm shaft 6 is joined to a connecting shaft 7 via a coupling 3 so that these shafts are in one body, and further to a motor (not shown) via a connecting gear mechanism 11. A motor shaft 13 forming a rotary driving shaft for the motor (not shown) is connected to the gear mechanism 11, and this motor shaft 13 is connected to the worm shaft 6 via a gear train of the gear mechanism 11 and connecting shaft 7.

The worm gear mechanism 1 has a low speed and a high torque, and is capable of driving a rotary table and the like smoothly. However, providing a certain degree of backlash between the meshed portions of the worm 5 and worm wheel 4 is usually necessary and indispensable, and among the gear train of the connecting gear mechanism 11, etc. connected to the motor shaft 13.

When the quantity of such a backlash is set large, the rotational resistance due to the friction of the surfaces of the teeth of the gear occurring during a high-speed rotation of the gears becomes low, and the generation of heat can be restrained. However, when a rotary table is positioned during a low-speed rotation thereof, it is rotated forward and backward. Therefore, every time the direction of rotation of the rotary table is changed, a quantity of play due to the backlash occurs to cause a position indexing accuracy to lower. Moreover, when a work is processed, an external force is applied thereto, and a decrease in a processing accuracy due to the occurrence of a rattle ascribed to the backlash of the gears, and vibration due to the processing operation occur in some cases.

When a backlash is set small for the purpose of increasing the a position indexing accuracy, an increase in the rotational resistance due to the friction of the surfaces of the teeth of the gear during a high-speed rotation of the indexing apparatus, and the generation of heat in and the abrasion of the surfaces of the teeth occur. Consequently, the indexing apparatus cannot be rotated at a high speed, and a processing speed lowers.

Therefore, in order to set the quantity of a backlash of a gear train of a related art worm gear mechanism and other similar mechanism, a suitable level is selected by taking a point of compromise in accordance with the use of the apparatus and from the above-mentioned contradictory points of view. In consequence, an indexing apparatus capable of being rotated at a high speed with a high accuracy have been unavailable.

The invention has been made in view of the above-mentioned circumstances, and provides an indexing apparatus capable of holding down the quantity of backlash, being driven at a high speed with a high accuracy and assembled easily; and a method of assembling the same.

SUMMARY OF THE INVENTION

The invention is directed to an indexing apparatus provided with a worm shaft having a worm thereon, a worm wheel meshed with the worm, and a motor for driving the worm shaft, the worm shaft and a shaft of the motor being connected together by a direct connecting method and the like without interposing a rotation transmission mechanism, such as gears, etc. therebetween.

The invention also provides an indexing apparatus in accordance with the above indexing apparatus, in which a body frame supporting the worm wheel thereon rotatably is provided, the worm shaft being supported rotatably at both end portions thereof on bearings, the bearing for one end portion of the worm shaft being provided on the body frame, the bearing provided for a motor shaft-side portion which constitutes the other end portion of the worm shaft being fixed to a bearing fixing portion formed on a retainer member to which the motor is fixed.

The invention further provides a method of assembling such an indexing apparatus, including providing a body frame on which a worm wheel is supported rotatably, and fixing with a worm shaft and a motor shaft in a unitarily connected state the worm shaft to a worm shaft fixing portion of the worm wheel-carrying body frame.

The invention also provides a method of assembling such an indexing apparatus in accordance with the above method, in which the method includes providing bearings around both end portions of the worm shaft, fixing one end portion of the worm shaft with the relative bearing to a bearing fixing portion formed on a retainer member to which a motor is fixed, and fixing the retainer member to the body frame, the worm shaft being thus fixed to the worm shaft fixing portion of the body frame.

BRIEF DESCRIPTION OF THE DRAWINGS

FIG. 5 is a longitudinal sectional view showing another embodiment of the indexing apparatus according to the invention.

DESCRIPTION OF THE PREFERRED EMBODIMENTS

Figure 1:
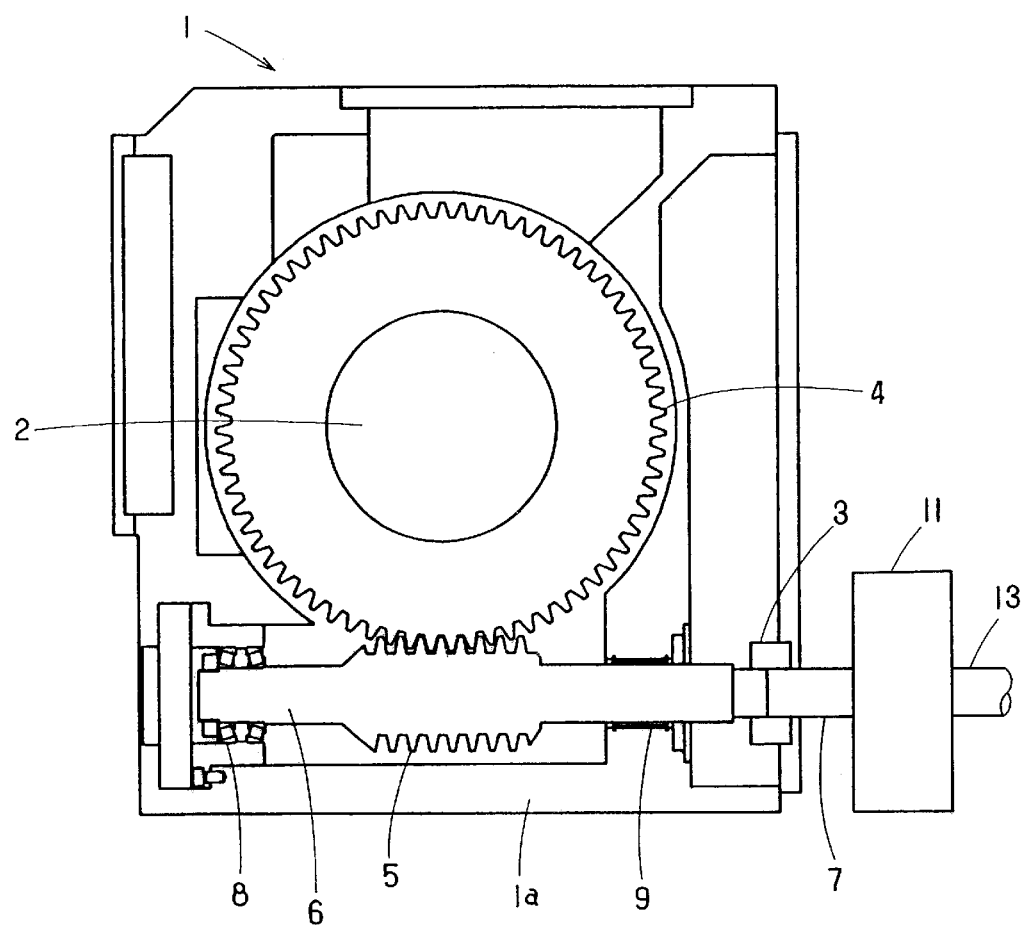
FIG. 1 is a schematic view in longitudinal section of a worm gear portion of a related art indexing apparatus.
Figure 2:
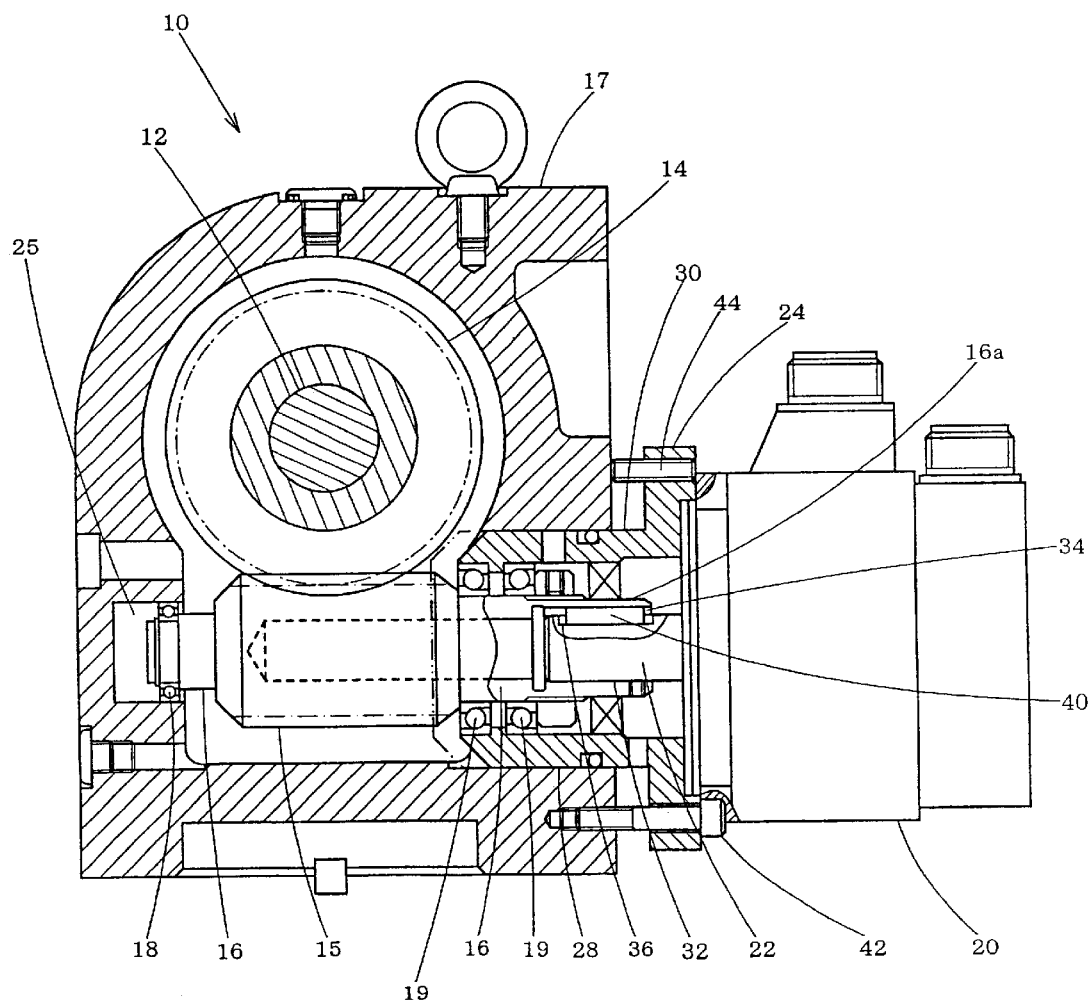
FIG. 2 is a longitudinal sectional view of an embodiment of the indexing apparatus according to the invention.
Figure 3:
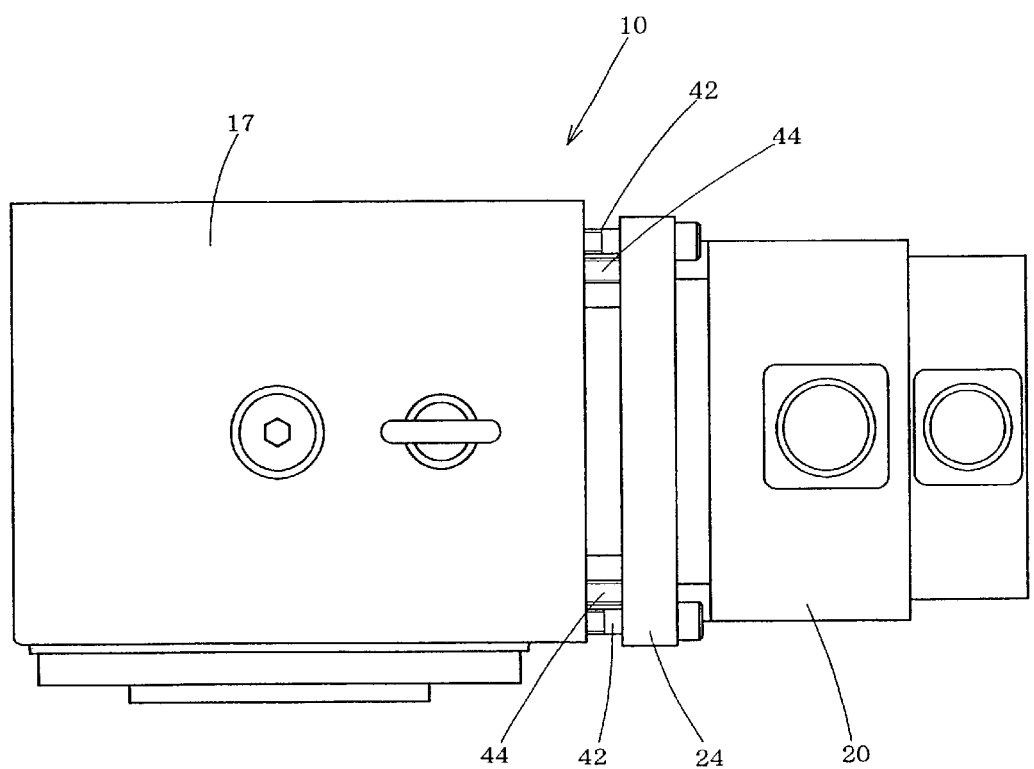
FIG. 3 is a plan view of the same embodiment of the indexing apparatus according to the invention.
Figure 4:
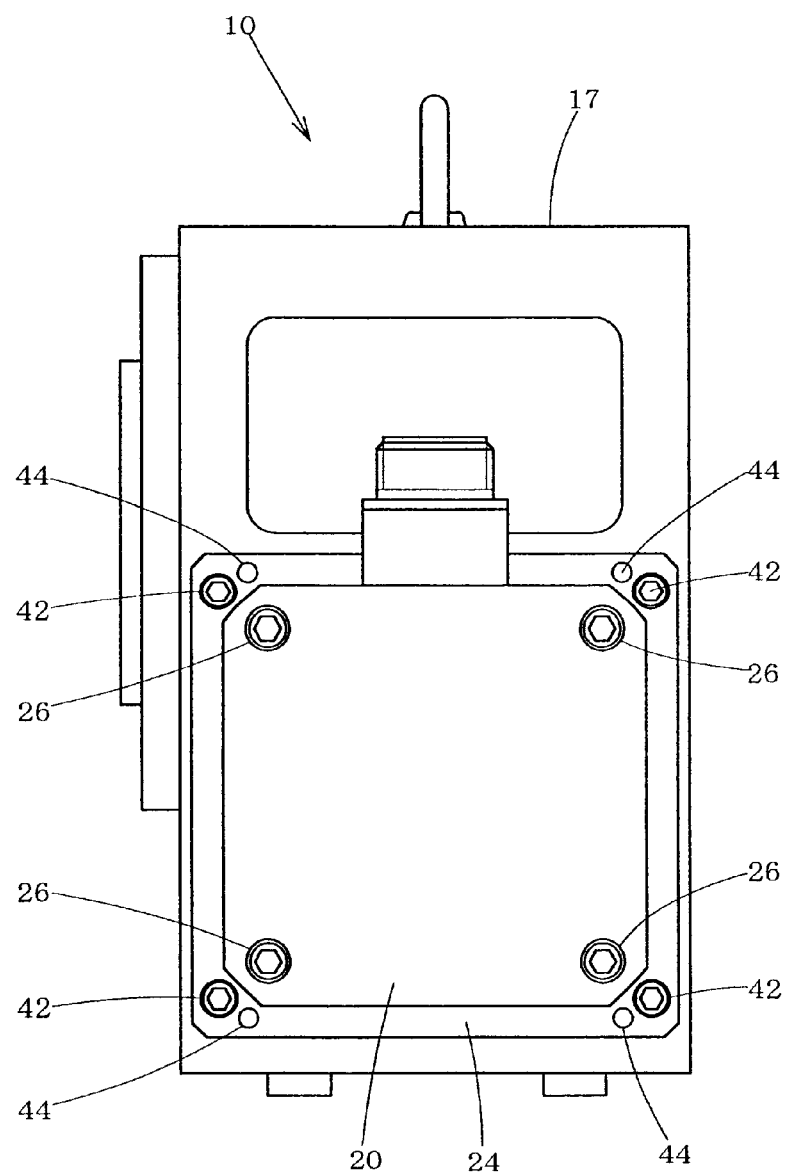
FIG. 4 is a right side view of the same embodiment of the indexing apparatus according to the invention.

The embodiments of the invention will now be described on the basis of what are shown in the drawings. FIG. 2 to FIG. 5 show an embodiment of the invention. An indexing apparatus 10 in this embodiment is provided with a worm gear mechanism, and used as an indexing apparatus for a rotary table and the like of a machine tool. This indexing apparatus 10 is provided with a rotary shaft 12 on which a rotary table (not shown) for placing thereon a work to be subjected to a predetermined process is fixed, and the rotary shaft 12 is supported rotatably on a body frame 17. A worm wheel 14 is fixed on this rotary shaft 12. A worm 15 is meshed with this worm wheel 14.

The worm 15 is made integral with the worm shaft 16, and one end of the worm shaft 16 is supported rotatably in a fixing recess 25, which forms a worm shaft fixing portion of the body frame 17, via a bearing 18. The other end of the worm shaft 16 is also supported rotatably on a pair of bearings 19. The two bearings 19 are held on a retainer member 24 of a motor 20 which will be described later, and fixed in an opened portion 28 forming the other worm shaft fixing portion of the body frame 17. The worm shaft 16 is connected directly to a shaft 22 of the driving motor 20 without interposing a gear mechanism and the like therebetween.

The worm shaft 16 is provided at one end portion 16a thereof with a fixing hole 32, in which the motor shaft 22 is fitted. The worm shaft 16 and motor shaft 22 are joined together in one body in the rotational direction owing to a key 40 fitted in a key way 34 formed in the fixing hole 32 and a key way 36 formed in the motor shaft 22.

The motor 20 is fixed to the retainer member 24 by bolts 26 and the like, and the retainer member 24 is fixed in an opened portion 28 of the body frame 17 with a cylindrical fitting portion 30 of the former fitted in the opened portion. The two bearings 19 are fitted in the interior of the cylindrical fitting portion 30. The retainer member 24 is fixed at four portions thereof to the body frame 17 by bolts 42, and regulated to a proper meshing position by setscrews 44. The tight fixing of the parts is thereby carried out.

A method of assembling the indexing apparatus in this embodiment will now be described. First, the bearing 18 is fixed around a front end portion of the worm shaft 16. The bearings 19 are then fixed around the other end portion of the worm shaft 16. The second-mentioned end portion of the worm shaft 16 is inserted with the bearings 19 from a front end side of the cylindrical fitting portion 30 of the retainer member 24 there through. The second-mentioned bearings 19 are then inserted from the opposite side of the cylindrical fitting portion 30 of the retainer member 24 around the bearing shaft 16, and set in a position in which a projection on an inner portion of the cylindrical fitting portion 30 is sandwiched between the two bearings 19 without leaving a clearance therebetween. The motor shaft 22 is then fitted in the fixing hole 32 for the worm shaft 16. During this time, the key 40 is fitted in the key way 36 of the motor shaft 22, and inserted into the key way 34 of the fixing hole 32 for the worm shaft 16. The motor 20 is fixed to the retainer member 24 by the bolts 26 with the motor shaft 22 and worm shaft 16 in a unitarily combined state. The worm shaft 16 and worm 15 are then inserted with the cylindrical fitting portion 30 of the retainer member 24 into the opened portion 28 of the body frame 17. The worm shaft 16 and worm wheel 14 are positioned by the setscrews 44 shown in FIG. 2 or spacers 45 shown in FIG. 5, in such a manner that the worm shaft and worm wheel are in a proper meshing position, these shafts being then fixed to the body frame 17 by the bolts 42.

In the indexing apparatus in this embodiment, the worm shaft 16 and motor shaft 22 are connected together directly, so that the rotation of the motor 20 is transmitted directly to the worm 15. Since a gear train is not provided between the motor and worm, a rattle and play due to a backlash and the like of gear train do not occur, and the rotation of the motor 20 is transmitted accurately to the worm wheel 12 via the worm shaft 16. Moreover, this enables the number of parts to be reduced, and contributes to the miniaturization of the apparatus and the reduction of the manufacturing cost.

During the assembling of this apparatus, the worm shaft 16 and motor shaft 22 are fixed in a connected state in the body frame 17, so that the assembling man-day can be reduced. Since the worm shaft 16 is joined to the motor shaft 22 in advance, the assembling accuracy becomes high. Especially, the worm shaft 16 is retained with the bearings 19 in the cylindrical fitting portion 30 of the retainer member 24, and this enables the apparatus to be assembled simply with a higher accuracy.

The indexing apparatus and the method of assembling the same according to the invention are not limited to the above-described embodiments. The method of connecting the worm shaft and motor shaft together directly may be replaced with a method of connecting these shafts together via a coupling having an automatic aligning function, or via a connecting device which does not shake, besides a method of connecting these shafts together concentrically.

According to the indexing apparatus according to the invention, it has become possible to eliminate a gear train provided heretofore between the motor and worm, reduce driving play which is ascribed to the presence of a backlash of the gear, and carry out a more accurate position indexing operation. Moreover, this apparatus enables the simplification of the construction, the miniaturization of the apparatus and the reduction of the number of parts to be attained.

According to the method of assembling the indexing apparatus of the invention, the worm shaft and motor shaft are connected together directly in advance, and the resultant shafts are fixed to the body frame, so that the reduction of the assembling time and the improvement of the assembling accuracy can be attained. Especially, the worm shaft is fixed to the retainer member of the motor, and then to the body frame. Therefore, the worm shaft can be fixed more accurately, simply and firmly.

What is claimed is:

1. An indexing apparatus comprising:

a worm shaft having a worm thereon, a worm wheel meshed with the worm, a rotary shaft on which the worm wheel is fixed, and a motor for driving the worm shaft, wherein the rotary shaft is adapted to have a rotary table fixed thereon, and wherein the worm shaft and a shaft of the motor are connected together directly without interposing a rotation transmission mechanism therebetween.

2. The indexing apparatus according to claim 1, wherein:

a body frame rotatably supports the worm wheel, the worm shaft is supported rotatably at first and second end portions thereof on bearings, the bearing for the first end portion of the worm shaft is provided on the body frame, a retainer member fixes the motor to the body frame, and the bearing provided for a motor shaft-side portion which constitutes the second end portion of the worm shaft is fixed to a bearing fixing portion formed on the retainer member.

* * * * *